(12) United States Patent
Niu et al.

(10) Patent No.: US 12,453,801 B2
(45) Date of Patent: Oct. 28, 2025

(54) NUCLEIC ACID-CALCIUM PHOSPHATE NANOPARTICLE COMPLEXES AND APPLICATION THEREOF IN BIOMINERALIZATION

(71) Applicant: The Fourth Military Medical University of Chinese People's Liberation Army, Xi'an (CN)

(72) Inventors: Lina Niu, Xi'an (CN); Jihua Chen, Xi'an (CN); Kia Jiao, Xi'an (CN); Minjuan Shen, Xi'an (CN); Yuxuan Ma, Xi'an (CN); Jianfei Yan, Xi'an (CN); Qianqian Wan, Xi'an (CN); Jing Li, Xi'an (CN)

(73) Assignee: The Fourth Military Medical University of Chinese People's Liberation Army, Xi' (CN)

( * ) Notice: Subject to any disclaimer, the term of this patent is extended or adjusted under 35 U.S.C. 154(b) by 479 days.

(21) Appl. No.: 17/632,064

(22) PCT Filed: Aug. 7, 2020

(86) PCT No.: PCT/CN2020/108009
§ 371 (c)(1),
(2) Date: Feb. 1, 2022

(87) PCT Pub. No.: WO2021/196490
PCT Pub. Date: Oct. 7, 2021

(65) Prior Publication Data
US 2023/0372585 A1 Nov. 23, 2023

(30) Foreign Application Priority Data
Mar. 31, 2020 (CN) .......................... 202010246314.5

(51) Int. Cl.
*A61L 27/24* (2006.01)
*A61L 27/12* (2006.01)
*A61L 27/46* (2006.01)
*A61L 27/54* (2006.01)
*C12N 15/87* (2006.01)

(52) U.S. Cl.
CPC .............. *A61L 27/24* (2013.01); *A61L 27/12* (2013.01); *A61L 27/46* (2013.01); *A61L 27/54* (2013.01); *C12N 15/87* (2013.01); *A61L 2300/258* (2013.01); *A61L 2300/412* (2013.01); *A61L 2300/624* (2013.01); *A61L 2400/12* (2013.01); *A61L 2430/02* (2013.01); *A61L 2430/12* (2013.01)

(58) Field of Classification Search
CPC .......... A61L 27/24; A61L 27/12; A61L 27/46; A61L 27/54; A61L 2300/412; A61L 2400/12; A61L 2430/02; A61L 2430/12
See application file for complete search history.

(56) References Cited

U.S. PATENT DOCUMENTS

| | | | |
|---|---|---|---|
| 2007/0077306 | A1 | 4/2007 | Akaike et al. |
| 2017/0326272 | A1 | 11/2017 | Harding et al. |

FOREIGN PATENT DOCUMENTS

| | | |
|---|---|---|
| CN | 103536965 A | 1/2014 |
| CN | 107224609 A | 10/2017 |
| CN | 107867677 A | 4/2018 |
| CN | 107929812 A | 4/2018 |
| CN | 109534349 A | 3/2019 |
| CN | 110628767 A | 12/2019 |
| CN | 11069372 A | 1/2020 |
| CN | 110898253 A | 3/2020 |
| WO | 2005016368 A2 | 2/2005 |

OTHER PUBLICATIONS

Oyane et al. "Controlled superficial assembly of DNA-amorphous calcium phosphate nanocomposite spheres for surface-mediated gene delivery." Colloids and Surfaces B: Biointerfaces 141 (2016): 519-527. (Year: 2016).*
Wang et al. "Interfacing DNA oligonucleotides with calcium phosphate and other metal phosphates." Langmuir 34.49 (2017): 14975-14982 (Year: 2017).*
Cai et al. "Calcium phosphate nanoparticles in biomineralization and biomaterials." Journal of Materials Chemistry 18.32 (2008): 3775-3787 (Year: 2008).*
"DNA Framework-Encoded Mineralization of Calcium Phosphate" (Xiaoguo Liu et al.), vol. 6, Issue 2, pp. 472-485, 2020, Jan. 2, 2020.
«Nucleic Acids Research» , pp. 3609 to 3610, col. 23, Issue 17—Weihong Song et al, "Efficient transfection of DNA by mixing cells in suspension with calcium phosphate", Dec. 31, 1995.
«Colloids and Surfaces B: biointerfaces» , pp. 519-527, col. 141— Ayako Oyane et al, "Controlled superficial assembly of DNA-amorphous calcium phosphate nanocomposite spheres . . . ", Feb. 10, 2016.

(Continued)

*Primary Examiner* — Emily A Cordas
(74) *Attorney, Agent, or Firm* — DeLio Peterson & Curcio LLC; Kelly M. Nowak (57) ABSTRACT

Disclosed are nucleic acid-calcium phosphate nanoparticle complexes and application thereof in biomineralization. Specifically, disclosed are a biological mineralizer and a preparation method thereof. The mineralizer contains a complex formed by nucleic acid and amorphous calcium phosphate nanoparticles. Further, disclosed is a collagen fiber product containing the biological mineralizer or treated with the biological mineralizer, such as a medical device for being implanted into a patient. Further, disclosed is use of the biological mineralizer or the collagen fiber product in treatment of bone-associated diseases or disorders or improvement of bone conditions of patients. Further, disclosed is a method of using the biological mineralizer to induce biomimetic mineralization of collagen fibers or a preparation method of a mineralized collagen fiber product.

19 Claims, 7 Drawing Sheets

(56) References Cited

OTHER PUBLICATIONS

«ACS Biomaterials Science & Engineering», pp. 3201-3211, col. 5—Razieh Khalifehzadeh et al—"DNA-Templated Strontium-Doped Calcium Phosphate Nanoparticles for Gene Delivery in Bone Cells", May 22, 2019.
International Search Report; International Application No. PCT/CN2020/108009; International Filing Date—Aug. 7, 2020; Date of Mailing—Dec. 31, 2020; 3 pages.
Song et al., "Efficient Transfection of DNA by Mixing Cells in Suspension with Calcium Phosphate," Nucleic Acids Research, (1995), vol. 23, (No. 17), 3609-3611.

* cited by examiner

NUCLEIC ACID-CALCIUM PHOSPHATE NANOPARTICLE COMPLEXES AND APPLICATION THEREOF IN BIOMINERALIZATION

FIELD OF THE INVENTION

The present disclosure relates to the fields of bone tissue engineering and biological materials, and specifically relates to application of nucleic acid-calcium phosphate nanoparticle complexes in biomimetic mineralization, including preparation and application of a mineralized collagen composite material, and nucleic acid-calcium phosphate composite material-mediated efficient gene transfection and delivery.

BACKGROUND OF THE INVENTION

As an important organ, human bone tissues can not only provide mechanical support and protection for the body, but also maintain the balance of minerals and acid-base in the body. However, frequent occurrence of tumors, wounds, inflammations, surgical debridement, etc. causes bone loss and bone defects of patients, and then seriously reduces the life quantity. Therefore, it is urgent to repair bone tissue defects. Currently, there are many non-negligible problems and defects in the conventional transplantation technologies of autologous bones, allogeneic bones, heterogeneous bones, etc., such as a secondary wound and immunological rejection. Thus, development of biomimetically mineralized artificial bone repair materials that have excellent biological and mechanical properties and can structurally reproduce micro- and macrostructures of natural bone tissues is of importance to clinic treatment of bone defects and promotion of bone repair.

It can be found through analysis of hierarchical structures of a natural bone tissue that type I collagen fibers, water, and apatite are three main primary components of the bone tissue. Type I collagen fibers bound with apatite crystals form the secondary structure of the bone. Therefore, mineralized collagen fibers reproduced and prepared in vitro can simulate structures and properties of a natural bone tissue to a high degree, and are highly biomimetic materials for repairing bone defects.

In vitro biomimetic mineralization of type I collagen fibers is one of key study objects in the field of biomineralization. Non-collagenous proteins such as natural dentin matrix proteins and dentin sialophosphoproteins have relatively more negatively charged regions. They have the same properties as those of acidic amino acids, and can prevent nucleation of hydroxyapatite in an aqueous phase, that is, can be used as nucleation inhibitors, so they can stabilize amorphous calcium phosphate (ACP) nanoparticles in an aqueous solution. Then, ACP further penetrates into porose areas of collagen fibers or is deposited on surfaces of collagen fibers to achieve intra- and extrafibrillar mineralization of collagen. However, application of natural biological macromolecular proteins is limited due to defects, such as difficulty in acquisition, tedious in vitro synthesis, and high costs. Therefore, non-collagenous protein analogues, such as polyanionic polymers such as polyaspartic acid and polyacrylic acid, have received a lot of attention in the field of biomimetic mineralization. However, due to strong anionic or cationic characteristic, residues of these polyelectrolytes easily cause hydrolysis of phosphatides of cells, damage to organelles, and even apoptosis. When the non-collagenous protein analogues are applied in vivo, their biocompatibility shall be considered. Therefore, selecting non-collagenous protein analogues that have high biocompatibility, can be conveniently obtained, and meanwhile, can promote the efficient expression of osteogenic proteins in bone tissues, and then applying the same to rapid in vitro biomimetic mineralization of collagen fibers to prepare a material for repairing bone tissue defects have great application prospects and development potential.

SUMMARY OF THE INVENTION

With the development of biotechnologies, biomacromolecules carrying genetic information, such as RNA and DNA, may adhere to calcium phosphate particles prepared by a precipitation method. However, such a calcium phosphate complex is not in an amorphous state, and cannot be applied to the field of biomimetic mineralization either. RNA and DNA have anionic characteristics so that there is a natural electrostatic adsorption force between them and minerals, and they are easily obtained. If a modified preparation method is applied to biomimetic mineralization of collagen fibers, a new way may be provided for the development of novel bone materials.

In view of defects or deficiencies in the prior art, objectives of the present disclosure include applying in vitro biomimetic mineralization to in vivo induction of bone regeneration, and using nucleic acid to stabilize calcium and phosphorus so as to form a nucleic acid-ACP nanoparticle complex. The inventor first puts forward a preparation method of using nucleic acid-ACP nanoparticles to induce intra- and extrafibrillar mineralization of collagen, and collagen fibers can be rapidly mineralized under the simultaneous participation of RNA and DNA. Thus, an organic or inorganic hydroxyapatite-collagen composite material is formed, which is used as a bone material to repair bone defects.

In order to achieve the above objectives, the present disclosure adopts the following technical solutions.

According to a first objective of the present disclosure, the present disclosure uses RNA and DNA respectively to stabilize calcium and phosphorus so as to form an RNA-ACP nanoparticle complex and a DNA-ACP nanoparticle complex, respectively. The preparation method mainly includes the following steps.

At step (1), synthesizing RNA-ACP nanoparticles.

First, mouse bone marrow stromal cells (BMSC) are inoculated according to an initial cell inoculation density of $5 \times 10^4$ cells/cm$^2$, after osteogenic differentiation is induced for 7 to 28 days, total RNA of the cells are extracted by a Trizol™ method (the Trizol™ method is also known as guanidinium thiocyanate-phenol-chloroform extraction for isolating RNA, DNA, and proteins from biological samples), and the initial concentration of the obtained RNA is determined by an enzyme-linked immunosorbent assay (ELISA) reader, which is about 1,500 to 2,500 ng/μL. Then, mineralizing solutions are prepared. Equal volume of solutions of calcium chloride dihydrate and solutions of dipotassium hydrogen phosphate in high concentration and low concentration are prepared. Phosphate groups in RNA are negatively charged, so they can adsorb positively charged calcium ions via an electrostatic adsorption force. Therefore, RNA is first mixed with the calcium ions, which is conducive to the stability of the mixture and can improve the adsorption efficiency of the mixture. Then, phosphate ions are further added and bound to the calcium ions adsorbed onto the RNA to form a stable amorphous calcium phosphate complex. 100 μL of RNA is uniformly mixed with 450

μL of solutions of calcium chloride dihydrate in high and low concentrations respectively, and then 450 μL of solutions of dipotassium hydrogen phosphate in high and low concentrations are respectively slowly dropwise added into the mixed solutions of RNA-calcium chloride dihydrate. Finally, two groups of stable and clear RNA-ACP nanoparticle mineralizing solutions in high and low concentrations are respectively synthesized.

At step (2), synthesizing DNA-ACP nanoparticles.

Steps of synthesizing DNA-ACP nanoparticles are similar to those of synthesizing RNA-ACP nanoparticles. Specifically, DNA is extracted using a kit by a Trizol™ method, and its concentration may greater than 700 ng/μL. Then, mineralizing solutions are prepared. 150 μL of DNA is uniformly mixed with 425 μL of solutions of calcium chloride dihydrate in high and low concentrations respectively, and then 425 μL of solutions of dipotassium hydrogen phosphate in high and low concentrations are respectively slowly dropwise added into the mixed solutions of DNA-calcium chloride dihydrate. Two groups of stable and clear DNA-ACP nanoparticle mineralizing solutions in high and low concentrations are respectively synthesized.

Preferably, at steps (1) and (2), the selected cells are mouse BMSC or MC3T2, but other types of cells are not excluded.

Preferably, at steps (1) and (2), the initial cell inoculation density is $5 \times 10^4$ to $5 \times 10^5$ cells/cm$^2$, an initial medium contains α-MEM, 10% FBS, and 1% double-antibody, the cells are cultured for 2 days after being coated onto a plate, the medium is replated with an osteogenic induction medium when BMSC is in good condition, and the osteogenic induction medium is changed every 2 days. The initial concentration of the extracted RNA may be greater than 1,500 ng/μL only when the cells are in good condition and sufficient.

Preferably, at steps (1) and (2), the adopted osteogenic induction medium contains α-MEM, 10% FBS, 1% double-antibody, 0.1 μmol/L dexamethasone, 50 mg/L ascorbic acid, and 10 mmol/L β-sodium glycerophosphate.

Preferably, at steps (1) and (2), osteogenic differentiation is induced for 7 to 14 days.

Preferably, at steps (1) and (2), the calcium chloride dihydrate powder has a molecular weight of 147. A single solution of calcium chloride dihydrate in high concentration has a concentration of 7 mM; and a single solution of calcium chloride dihydrate in low concentration has a concentration of 3.5 mM. The dipotassium hydrogen phosphate powder has a molecular weight of 174. A single solution of dipotassium hydrogen phosphate in high concentration has a concentration of 4.2 mM; and a single solution of dipotassium hydrogen phosphate in low concentration has a concentration of 2.1 mM.

Preferably, at step (1), the initial concentration of the obtained nucleic acid is 100 to 5,000 ng/μL, preferably 500 to 5,000 ng/μL, and more preferably 1,000 to 3,000 ng/μL, such as 1,500 to 2,500 ng/μL. Finally, in the RNA-ACP mineralizing solutions, the working concentration of RNA may be greater than 150 μg/mL.

Preferably, at step (2), the initial concentration of the obtained nucleic acid is 100 to 5,000 ng/μL, preferably 500 to 5,000 ng/μL, more preferably 700 to 3,000 ng/μL, and more preferably 700 to 1,500 ng/μL, such as 1,000 ng/μL. Finally, in the DNA-ACP mineralizing solutions, the working concentration of DNA may be greater than 150 μg/mL.

Preferably, at step (1), finally, the two groups of RNA-ACP mineralizing solutions in high and low concentrations have pH values of about 6.0 to 6.5, are relatively stable and clear without precipitates, and can be stored at 4° C. for 3 days without RNA degradation.

Preferably, at step (2), finally, the two groups of DNA-ACP mineralizing solutions in high and low concentrations have pH values of about 6.0 to 6.5, are relatively stable and clear without precipitates, and can be stored at 4° C. for a long term without DNA degradation.

Preferably, at step (1), the RNA-ACP nanoparticles have an average particle size of 40 to 60 nm, and a diffraction spectrogram of the RNA-ACP nanoparticles shows that the RNA-ACP nanoparticles are amorphous.

Preferably, at step (2), the DNA-ACP nanoparticles have an average particle size of 60 to 100 nm, and are amorphous.

Preferably, at steps (1) and (2), the calcium-phosphorus mineralizing solution in high concentration has a final concentration ratio of calcium to phosphorus of 3.5:2.1; and the calcium-phosphorus mineralizing solution in low concentration has a final concentration ratio of calcium to phosphorus of 1.67:1.

According to a second objective of the present disclosure, the present disclosure uses the RNA-ACP nanoparticles and the DNA-ACP nanoparticles respectively to induce intra- and extrafibrillar mineralization of collagen. The induction method includes the following steps.

At step (1), preparing self-assembled collagen fibers.

A solution (5 mg/mL) of rat tail tendon collagen/acetic acid is used to complete self-assembly of collagen at 37° C. by a forward and reverse dialysis method, and loaded onto a metal net carrying a carbon support film. Preparation of self-assembled collage fibers is completed by means of crosslinking.

At step (2), determining mineralization strategy of mineralizing solution-collagen.

About 450 μL of nucleic acid-ACP nanoparticle mineralizing solution is dropwise added into an EP tube cap to form a uniform spherical shape. Then, a front surface of the nickel/gold net carrying collagen fibers is in contact with the mineralizing solution for mineralization for 5 days.

Preferably, at step (1), the net carrying a carbon support film that is dropwise added with the mineralizing solution may be a nickel net or a gold net. A copper net will be unstable during drying and volatilization of the mineralizing solution, which may affect experimental results.

Preferably, at step (1), the solution of collagen easily produces bacteria, so an anti-bacteria treatment shall be strictly performed during preparation.

Preferably, at step (1), the selected material may be a solution of rat tail tendon type I collagen/acetic acid, a self-assembled rat tail tendon, a self-assembled 3D collagen scaffold, a collagen film, a demineralized bone tissue, a demineralized dentin slice, etc.

Preferably, at step (2), the collage fibers need to be loaded on the front surface of the nickel/gold net, so that the collagen is in uniform contact with the mineralizing solution during mineralization.

According to a third objective of the present disclosure, a mineralized collagen fiber material obtained by the preparation method of the present disclosure can be used as a material for repairing hard tissue defects and can be applied to the field of bone tissue engineering.

Compared with other non-collagenous proteins/non-collagenous protein analogues that are used to stabilize calcium phosphate nanoparticles so as to induce in vitro biomimetic mineralization of collagen fibers, the present disclosure possesses the following advantages.

First, in the field of in vitro biomimetic mineralization, non-collagenous proteins/non-collagenous protein analogues can stabilize ACP and induce ACP to enter collagen fibers so as to complete intrafibrillar mineralization of collagen. However, non-collagenous proteins are usually difficult to directly extract from tissues or cells, in vitro synthesis of them is tedious, and the cost is high, which are not conductive to the following research. Therefore, many non-collagenous protein analogues, such as polyanionic compounds and polycationic compounds, receive a lot of attention and are applied to biomimetic intrafibrillar mineralization of collagen. In addition to certain mechanical strength and hardness, collagen fiber bone repair materials necessarily have high biocompatibility, nontoxicity, and low immunogenicity. Non-collagenous protein analogues, such as polycation, may cause phospholipid membrane perforation, damage to organelles, and apoptosis at last, and have high toxicity. Meanwhile, a large number of free high-concentration carboxy groups of polyanions may also cause damage to cells, which limits application. Biomacromolecules carrying genetic information, such as RNA and DNA, are derived from cells, so they not only have characteristics of low immunogenicity, low toxicity, high biocompatibility, etc., but also are widely used to transfect cells. Compared to natural proteins, they are easily obtained, and meanwhile, they have anionic characteristics, and can naturally electrostatically adsorb calcium ions. Therefore, as agents for stabilizing calcium phosphate and inducing intrafibrillar mineralization, they have outstanding advantages when applied.

Second, the nucleic acid-ACP achieves intra- and extrafibrillar mineralization of collagen, and hydroxyapatite are not only deposited in order in collagen fibers, but also adhere to surfaces of the collagen fibers to achieve intra- and extrafibrillar mineralization of collagen at the same time. The nucleic acid-ACP further simulates aspects, such as surface topography, components, hierarchical microstructures, and mechanical properties, of a natural bone tissue, and also meets the above requirements for the biological material. Therefore, it is an ideal biomimetic material for promoting bone regeneration and repairing bone defects.

Third, the nucleic acid-ACP can efficiently induce intrafibrillar mineralization of collagen in a short period, can complete intrafibrillar mineralization of a large range of collagen within 5 to 6 hours, can rapidly and efficiently mineralize collagen materials, and can meet requirements for clinical transformation in the later stage.

Fourth, there is an adsorption force between nucleic acid and collagen fibers, which simulates the interaction among collagen, non-collagenous proteins (nucleic acid), and minerals to a high degree. Therefore, the biomimetic mineralization mode provides an important idea for verifying the real mechanism of in vivo intrafibrillar mineralization of collagen.

Fifth, in the nucleic acid-ACP nanoparticle complexes, RNA and DNA are structurally stable and not easy to degrade for a long time. Therefore, the complexes may be added with osteogenesis expression-associated genes, so that the complexes can transfect cells to improve the transfection efficiency, control and maintain the expression of osteogenic proteins at bone defects, and further promote osteogenic differentiation and bone regeneration while completing biomimetic mineralization of collagen fibers. Transfection-mineralization double control collagen composite scaffolds prepared by the nucleic acid-ACP nanoparticle complexes can not only act as a support scaffold at a defect to provide good mechanical properties for the defect and create a good cellular microenvironment to facilitate cell ingrowth, but also continually deliver osteogenesis-associated genes into cells. Therefore, they can be widely used to treat or prevent bone-associated diseases, bone injuries, bone loss, and bone disorders, and can be further used to induce or enhance bone regeneration and osteogenic differentiation, and promote repair of bone defects.

In one aspect, the present disclosure relates to a complex (or referred to as a "nucleic acid-amorphous calcium phosphate nanoparticle complex", an "RNA- or DNA-ACP nanoparticle complex", a "nucleic acid-ACP nanoparticle complex", an "RNA/DNA-ACP nanoparticle complex", "RNA/DNA-ACP nanoparticles" or "nucleic acid-ACP", which can be used interchangeably) formed by nucleic acid and amorphous calcium phosphate nanoparticles. In one aspect, the complex is formed by the nucleic acid and the amorphous calcium phosphate nanoparticles by means of electrostatic adsorption. In one aspect, the present disclosure relates to use of the complex as a biological mineralizer in biomimetic mineralization. For example, the complex or the mineralizer is used to mineralize collagen fibers such as collagen fibers of a bone, a tooth or a dentin. The bone or the tooth may a bone or a tooth of a patient, or an in vitro bone or tooth material. In one aspect, the biological mineralizer of the present disclosure may be in the form of composition such as a composition for mineralizing collagen fibers of a bone, a tooth or a dentin.

In one aspect, the present disclosure relates to a biological mineralizer containing a complex formed by nucleic acid and amorphous calcium phosphate nanoparticles. The complex is formed by the nucleic acid and the amorphous calcium phosphate nanoparticles by means of electrostatic adsorption. For example, the complex is formed by the following method: phosphate groups of the nucleic acid electrostatically adsorb calcium ions of the nanoparticles; and the calcium ions adsorbed onto the nucleic acid further electrostatically adsorb free phosphate ions.

In one aspect, the biological mineralizer of the present disclosure is formed by mixing a solution of nucleic acid with a solution of calcium chloride and a solution of dipotassium hydrogen phosphate.

In the biological mineralizer of the present disclosure, the calcium ion concentration is 0.1 to 100 mM, preferably 0.5 to 50 mM, more preferably 1 to 10 mM, more preferably 2 to 5 mM, and more preferably 1.67 to 3.5 mM. For example, the calcium ion concentration may be 1 mM, 1.2 mM, 1.5 mM, 2 mM, 2.5 mM, 3 mM, 3.5 mM or 7 mM. In the biological mineralizer of the present disclosure, the phosphate ion concentration may be 0.1 to 100 mM, preferably 0.2 to 50 mM, preferably 0.5 to 10 mM, more preferably 1 to 5 mM, and more preferably 1.0 to 2.1 mM. For example, the phosphate ion concentration may be 0.5 mM, 0.6 mM, 0.8 mM, 1.0 mM, 1.2 mM, 1.5 mM, 2.1 mM or 4.2 mM. These features are applicable to the preparation method of the biological mineralizer of the present disclosure.

In the biological mineralizer of the present disclosure, a ratio of the calcium ions to the phosphate ions is 10:1 to 1:5, preferably 5:1 to 1:3, preferably 3.5:1 to 1:1.25, and more preferably 2:1 to 1:1, such as 1.67:1. For example, the ratio of the calcium ions to the phosphate ions is 10:1, 8:1, 5:1, 4:1, 3:1, 2:1, 1.9:1, 1.7:1, 1.6:1, 1.5:1, 1.2:1, 1:1.5, 1:1.6, 1:1.7, 1:1.9, 1:2, 1:3 or 1:4. These features are applicable to the preparation method of the biological mineralizer of the present disclosure.

In the biological mineralizer of the present disclosure, the complex formed by the nucleic acid and the amorphous calcium phosphate nanoparticles has a particle size of 1 to 100 nm, preferably 10 to 100 nm, and more preferably 20 to 100 nm, such as 40 to 60 nm and 60 to 100 nm. For example, the particle size may be 5 nm, 30 nm, 50 nm, 70 nm or 80 nm. These particle size ranges are applicable to the complex formed by DNA or RNA.

In one aspect, the nucleic acid of the present disclosure may be RNA. In one aspect, the nucleic acid of the present disclosure may be DNA. In another aspect, the nucleic acid is total DNA or total RNA isolated from mammalian cells or plasmid DNA. In another aspect, the nucleic acid includes nucleic acid promoting osteogenic differentiation and/or bone regeneration. In one aspect, the nucleic acid is selected from miR-17-92, miR-26a, miR-148b, and BMP2-plasmid DNA. In this aspect, the mammalian cells may be selected from osteoprogenitor cells, pre-osteoblasts (e.g. MC3T3), bone marrow stromal cells (e.g. BMSC), osteocytes, osteogenitor cells, osteoblasts, and osteoclasts. Preferably, the nucleic acid is total DNA or total RNA isolated from a pre-osteoblast line or a bone marrow stromal cell line. In this aspect, the mammalian cells may be cells derived from human, a mouse, a rat, a pig, a cow, a sheep, a cat, a dog, a horse or a monkey. In one example, the mammalian cells may be mouse pre-osteoblasts or mouse bone marrow stromal cells. The plasmid DNA may be derived from bacteria such as *Escherichia coli*.

In the biological mineralizer of the present disclosure, the working concentration of the nucleic acid is 20 to 800 μg/mL, more preferably 50 to 700 μg/mL, more preferably 80 to 600 μg/mL, preferably 100 to 500 μg/mL, and more preferably 150 to 300 μg/mL, such as 160 to 250 μg/mL and 150 μg/mL. These nucleic acid concentrations are applicable to DNA or RNA.

The initial concentration of the nucleic acid is 100 to 5,000 ng/μL, preferably 500 to 5,000 ng/μL, and more preferably 1,000 to 3,000 ng/μL. These nucleic acid concentrations are applicable to DNA or RNA. For example, the working concentration of the nucleic acid is preferably 70 to 150 μg/mL (applicable to DNA); or the working concentration is preferably 150 to 250 μg/mL (applicable to RNA). The biological mineralizer of the present disclosure has a pH value of 5.5 to 7, and preferably 6.0 to 6.5. For example, the pH value is 5.6, 5.7, 5.8, 5.9, 6.0, 6.1, 6.2, 6.3, 6.4, 6.5, 6.6, 6.7, 6.8 or 6.9.

In one aspect, the biological mineralizer of the present disclosure may be in a liquid state such as a solution and a colloidal solution; or in a semisolid state such as a gel; or in a solid state such as powder and lyophilized powder. The biological mineralizer of the present disclosure is preferably in the liquid state, and more preferably a solution. In another aspect, the biological mineralizer of the present disclosure may be lyophilized powder. The biological mineralizer may also contain physiologically acceptable excipients or additives, and preferably contains excipients or additives conducive to mineralization of collagen fibers. The biological mineralizer in the liquid state may also contain dissolvents or solvents such as water. These excipients, additives, and dissolvents are well-known to those skilled in the art.

In one aspect, the present disclosure relates to a mineralized collage fiber product containing the biological mineralizer of the present disclosure or treated with the biological mineralizer of the present disclosure. The mineralized collagen fiber product may be a medical device such as a medical device for being implanted into a patient. In one aspect, the mineralized collagen fiber product may be selected from or include collagen scaffolds (or 3D collagen scaffolds), collagen films, collagen fiber sheets (or 2D collagen scaffolds), demineralized bone tissues, demineralized dentin slices, and mouse tails. In one aspect, the mineralized collagen fiber product is selected from tooth or bone repair materials, tooth or bone scaffold materials, tooth or bone regeneration materials, and tooth or bone implant materials.

In one aspect, the collagen fibers of the present disclosure are osteocollagenous fibers, and preferably type I collagen fibers. In one aspect, the biological mineralizer of the present disclosure is used to mineralize collagen fibers such as osteocollagenous fibers. In one aspect, the biological mineralizer of the present disclosure is used to mineralize a collagen fiber product. The mineralization may be performed on a patient in vitro or in vivo.

In one aspect, the patient may be human, a mouse, a rat, a pig, a cow, a sheep, a cat, a dog, a horse or a monkey, and preferably human.

In one aspect, the present disclosure relates to use of the biological mineralizer or the mineralized collagen fiber product in preparation of a drug or a medical device for treating bone-associated diseases or disorders or improving bone conditions of patients. In another aspect, the present disclosure relates to a biological mineralizer or a mineralized collagen fiber product used to treat bone-associated diseases or disorders or improve bone conditions of patients. In another aspect, the present disclosure relates to a method for treating bone-associated diseases or disorders or improving bone conditions of patients in need, and the method includes a step of administrating a therapeutically effective amount of mineralizer or mineralized collagen fiber product of the present disclosure to patients. The therapeutically effective amount may be determined by those skilled in the art according to the actual conditions.

In one aspect, the drug prepared in the present disclosure is used to treat bone defects or bone loss, or promote bone repair, osteogenic differentiation or bone regeneration. In another aspect, the biological mineralizer or the mineralized collagen fiber product of the present disclosure is used to treat bone defects or bone loss, or promote bone repair, osteogenic differentiation or bone regeneration. In another aspect, the present disclosure relates to a method for treating bone defects or bone loss, or promoting bone repair, osteogenic differentiation or bone regeneration of patients in need, and the method includes a step of administrating a therapeutically effective amount of mineralizer or mineralized collagen fiber product of the present disclosure to patients.

In one aspect, the present disclosure relates to use of the biological mineralizer in preparation of a drug for mineralizing osteocollagenous fibers of patients. In another aspect, the present disclosure relates to a biological mineralizer used to mineralize osteocollagenous fibers of patients. In one aspect, the present disclosure relates to a method for mineralizing osteocollagenous fibers of patients, and the method includes a step of administrating a therapeutically effective amount of mineralizer of the present disclosure to patients.

In one aspect, the present disclosure relates to a preparation method of a biological mineralizer, and the method includes the following steps: at step (1), nucleic acid is obtained; at step (2), the nucleic acid obtained at step (1) is mixed with a solution of calcium chloride; and at step (3), a solution of dipotassium hydrogen phosphate is added into the mixture obtained at step (2) to obtain a complex formed by nucleic acid and amorphous calcium phosphate nanoparticles. At step (1) of the method, the nucleic acid may be total DNA or total RNA extracted from mammalian cells or plasmid DNA. In another aspect, the initial concentration of the nucleic acid obtained at step (1) is preferably 700 to 1,000 ng/μL (DNA); or 1,500 to 2,500 ng/μL (RNA). For example, the initial concentration of the nucleic acid may be 700 ng/μL, 1,000 ng/μL, 1,600 ng/μL, 1,700 ng/μL, 1,800 ng/μL, 1,900 ng/μL, 2,000 ng/μL or 2,500 ng/μL. In one aspect, the initial concentration of the RNA obtained at step (1) is 1,400 to 2,500 ng/μL, and preferably 1,500 to 2,500 ng/μL. In one aspect, the initial concentration of the DNA obtained at step (1) may be greater than 700 ng/μL, and optimally 1,000 ng/μL. At step (3) of the method, the calcium ion concentration is 1 to 10 mM, preferably 2 to 5 mM, and more preferably 1.67 to 3.5 mM. At step (3) of the method, the phosphate ion concentration is 0.5 to 10 mM, preferably 1 to 5 mM, and more preferably 1.0 to 2.1 mM. In the method, a ratio of the calcium ions to the phosphate ions is 10:1 to 1:5, preferably 5:1 to 1:3, preferably 3.5:1 to 1:1.25, more preferably 2:1 to 1:1, and preferably 5:3 or 1.67:1.

In one aspect, the present disclosure relates to a method for inducing biomimetic mineralization of collagen fibers. In another aspect, the present disclosure relates to a preparation method of a mineralized collagen fiber product. The method including a step of allowing the biological mineralizer of the present disclosure to be in contact with collagen fibers or a product containing collagen fibers, such as in a solution. In this aspect, the biological mineralizer of the present disclosure is mixed with the collagen fibers in the solution. The contact time or the mineralization time may be more than 0.5 hours, such as at least 1 hour, at least 2 hours, at least 3 hours, at least 4 hours, at least 5 hours, at least 6 hours, at least 8 hours, at least 10 hours, at least 12 hours, at least 16 hours, at least 24 hours, at least 30 hours, at least 36 hours, at least 48 hours, at least 60 hours, and at least 72 hours. The contact time or the mineralization time may be at least 1 day, at least 2 days, at least 3 days, at least 4 days, at least 5 days, at least 6 days, at least 7 days, at least 8 days, at least 9 days, at least 10 days, at least 15 days, at least 20 days, at least 25 days, or at least 30 days. For example, the contact time or the mineralization time may be 1 to 10 days, preferably 2 to 8 days, more preferably 3 to 7 days, more preferably 4 to 6 days, such as 5 days. In one aspect, the collagen is completely mineralized after 5 hours of contact. In one aspect, the present disclosure relates to a preparation method of a complex of RNA and amorphous calcium phosphate nanoparticles. The method of the present disclosure may include the following steps: at step (1), RNA is extracted; at step (2), the obtained RNA is mixed with a solution of calcium chloride; and at step (3), the mixed solution of RNA-calcium chloride is mixed with a solution of dipotassium hydrogen phosphate to obtain an RNA-ACP mineralizing solution. In one aspect, the RNA is extracted by a Trizol™ method. The initial concentration of the extracted RNA may be about 1,500 to 2,500 ng/μL. In one aspect, negatively charged phosphate groups of RNA can adsorb calcium ions via an electrostatic adsorption force. In one aspect, the calcium ions adsorbed onto the RNA further electrostatically adsorb phosphate ions in the solution. The obtained RNA-ACP mineralizing solution may be clear.

In one aspect, in the RNA-ACP mineralizing solution, the calcium ion or calcium concentration is 1.67 to 3.5 mM; and the phosphate ion or phosphate concentration is 1.0 to 2.1 mM. In one aspect, a ratio of the calcium ions to the phosphate ions is 5:3 or 1.67:

In one aspect, the extracted RNA is total RNA of mammalian cells, such as total RNA derived from a mouse pre-osteoblast line (MC3T3) or a mouse bone marrow stromal cell line (BMSC). In one aspect, the RNA includes RNA promoting osteogenic differentiation and/or bone regeneration, such as miR-17-92, miR-26a, and miR-148b.

In one aspect, the initial concentration of RNA is 1,500 to 2,500 ng/μL. Finally, in the RNA-ACP mineralizing solution, the working concentration of RNA may be 150 to 250 μg/mL.

The RNA-ACP mineralizing solution of the present disclosure is clear without precipitates, can be stored at 4° C. for 3 days without RNA degradation, is relatively stable, and has a pH value of about 6.0 to 6.5.

In one aspect, the RNA-ACP nanoparticles have particle sizes of 40 to 60 nm. The nanoparticles of the present disclosure are amorphous or non-crystalline.

In one aspect, the present disclosure relates to a preparation method of a complex of DNA and amorphous calcium phosphate nanoparticles. The method of the present disclosure may include the following steps: at step (1), DNA is extracted; at step (2), the obtained DNA is mixed with a solution of calcium chloride; and at step (3), the mixed solution of DNA-calcium chloride is mixed with a solution of dipotassium hydrogen phosphate to obtain a DNA-ACP mineralizing solution. In one aspect, the DNA is extracted by a Trizol™ method or using a kit. The initial concentration of the extracted DNA may be greater than 700 ng/μL. In one aspect, negatively charged phosphate groups of DNA can adsorb calcium ions via an electrostatic adsorption force. In one aspect, the calcium ions adsorbed onto the DNA further electrostatically adsorb phosphate ions in the solution. The obtained DNA-ACP mineralizing solution may be clear.

In one aspect, in the DNA-ACP mineralizing solution, the calcium ion concentration is 1.67 to 3.5 mM; and the phosphate ion concentration is 1.0 to 2.1 mM. In one aspect, a ratio of the calcium ions to the phosphate ions is 5:3 or 1.67:1.

In one aspect, the extracted DNA is total DNA of mammalian cells or plasmid DNA, such as total DNA derived from a mouse pre-osteoblast line (MC3T3) or a mouse bone marrow stromal cell line (BMSC) and plasmid DNA derived from *Escherichia coli*. In one aspect, the DNA includes DNA promoting osteogenic differentiation and/or bone regeneration.

In one aspect, the initial concentration of DNA is optimally 1,000 ng/μL. Finally, in the DNA-ACP mineralizing solution, the working concentration of DNA may be greater than 150 g/mL.

The DNA-ACP mineralizing solution of the present disclosure is clear without precipitates, can be stored at 4° C. for a long term without DNA degradation, is relatively stable, and has a pH value of about 6.0 to 6.5.

In one aspect, the DNA-ACP nanoparticles have particle sizes of 60 to 100 nm. A diffraction spectrogram shows that the nanoparticles of the present disclosure are amorphous or non-crystalline.

In one aspect, the present relates to a method of using nucleic acid-ACP nanoparticles to induce biomimetic mineralization of collagen fibers. The method may include a step of allowing collage fibers to be in contact with the biological mineralizer of the present disclosure. In one aspect, the method may include a step of mixing the biological mineralizer of the present disclosure with collagen fibers in a solution.

In one aspect, collagen fibers that can be mineralized include 3D collagen scaffolds, collagen films, 2D collagen fibers, demineralized bone tissues, demineralized dentin slices, rat tails, etc.

In one aspect, the RNA- or DNA-ACP nanoparticles can mediate rapid intrafibrillar mineralization of collagen. After the collagen is soaked for 3 hours, intrafibrillar mineralization can be observed. After the collagen is soaked for 6 hours, intrafibrillar mineralization of a large area of collagen can be observed, and intrafibrillar crystals are arranged in order along a C axis of the collagen.

In one aspect, minerals (e.g. nanoparticles) can be deposited on surfaces of or in collagen fibers to complete intrafibrillar and extrafibrillar mineralization of collagen. The mineralization mode may be adhesion and/or adsorption of nucleic acid to surfaces of collagen fibers.

In one aspect, the nucleic-ACP nanoparticles induce intra- and extrafibrillar mineralization of collagen. In the term of microstructure, the mineralized collagen of the present disclosure is very similar to mineralized collagen fibers of a femur of a mouse in vivo.

In one aspect, the RNA- or DNA-ACP nanoparticles induce intra- and extrafibrillar mineralization of collagen. The mineralized collagen composite material can be used to repair bone defects, promote osteogenic differentiation, and enhance bone regeneration.

In one aspect, the RNA- or DNA-ACP nanoparticles can continually deliver osteogenesis expression-associated genes into cells while inducing biomimetic mineralization of collagen. The complex of nucleic acid and amorphous calcium phosphate nanoparticle of the present disclosure can be used as an RNA or DNA delivery system. The delivery system can be used to transfect cells, control and maintain the expression of osteogenic proteins at bone defects, and further promote osteogenic differentiation and bone regeneration.

In one aspect, the RNA- or DNA-ACP nanoparticle complex is used to prepare a transfection-mineralization double control collagen composite scaffold. The product, the scaffold or the complex of the present disclosure can be used to treat or prevent bone-associated diseases, bone defects, bone loss, and bone disorders, or induce or enhance bone regeneration and bone differentiation, and promote repair of bone defects.

DETAILED DESCRIPTION OF THE EMBODIMENTS

The present disclosure extracts biomacromolecules having anionic properties, such as RNA and DNA, from cells, and use the same in vitro to stabilize minerals such as calcium phosphate by means of biomimetic mineralization so as to prepare a nucleic acid-ACP nanoparticle complex. Meanwhile, as an agent for inducing mineralization of collage fibers, nucleic acid makes ACP enter the collage fibers and be deposited between collagen fibers to complete biomimetic intra- and extrafibrillar mineralization of collagen. Thus, an organic/inorganic hydroxyapatite-collagen composite material having high biocompatibility, low immunogenicity, fast mineralizing speed, and high mechanical strength is prepared, which provides an unique and efficient solution for repair of bone tissue defects.

The following specific examples are provided by the inventor to further explain and describe the technical solutions of the present disclosure.

Example 1

(1) Mouse BMSC were inoculated into T75 according to an initial coating density of $5 \times 10^4$ cells/cm$^2$, and cultured with αMEM containing 10% FBS for 2 days. When the cells were in good condition and at a confluence of about 70 to 80%, an osteogenic induction medium was added and changed every 2 to 3 days.

(2) After osteogenic differentiation was induced for 7 days, total RNA of the cells was extracted by a Trizol™ method when the cell grew well. Because RNA is easily degraded, the extraction is performed at low temperature on ices, and the used tools need to be subjected to enzyme-free treatment. Finally, the obtained RNA precipitates were dissolved in nuclease-free water.

(3) the concentration of solution of RNA in each EP tube was determined by using an ELISA reader, and the solutions of RNA having an initial concentration of greater than 1,500 ng/μL were selected and mixed together to obtain 1 mL of solution of RNA in a high concentration of 1,600 to 2,500 ng/μL.

(4) Equal amounts of nuclease-free water was respectively added into 2 centrifuge tubes with a volume of 15 mL, and calcium chloride dihydrate powder (having a molecular weight of 147) was prepared into solutions containing calcium ions in concentrations of 7 mM and 3.5 mM, respectively.

(5) Equal amounts of nuclease-free water was respectively added into 2 centrifuge tubes with a volume of 15 mL, and dipotassium hydrogen phosphate powder (having a molecular weight of 174) was prepared into solutions containing phosphate ions in concentrations of 4.2 mM and 2.1 mM, respectively. The solutions used in the present example for preparing reagents are nuclease-free water.

(6) 100 μL of RNA was mixed with the solution (450 μL) of calcium chloride dihydrate in the concentration of 7 mM, and then equal volume of solution (450 μL) of dipotassium hydrogen phosphate in the concentration of 4.2 mM was slowly dropwise added into the mixture. An RNA-ACP mineralizing solution in high concentration having a concentration ratio of calcium to phosphorus of 3.5:2.1 was prepared. Similarly, 100 μL of RNA was mixed with the solution (450 μL) of calcium chloride dihydrate in the concentration of 3.5 mM, and then equal volume of solution (450 μL) of dipotassium hydrogen phosphate in the concentration of 2.1 mM was slowly dropwise added into the mixture. An RNA-ACP mineralizing solution in low concentration having a concentration ratio of calcium to phosphorus of 1.67:1 was prepared.

(7) A solution (8 mg/mL) of rat tail tendon collagen/acetic acid was placed into a dialysis bag, and the dialysis bag was fastened.

(8) The dialysis bag was placed into a phosphate buffer solution (PBS, pH 7.4). The dialysis solution was changed at 37° C. every 12 hours.

(9) After 72 hours, the self-assembly of collagen fibers was completed, in order to reduce the influence of phosphate ions on the self-assembled collagen fibers, the PBS dialysis solution was replaced with deionized water (pH 7.4), and reverse dialysis was performed.

(10) After 48 hours, an appropriate amount of solution (8 mg/mL) of collagen in the dialysis bag was taken by using a pipette and dropwise added onto a 400-mesh nickel/gold net covered with carbon support film, and the net faced up and was dried at room temperature.

(11) The collagen fibers were cross-linked with a solution of 0.3 M 1-(3-dimethylaminopropyl)-3-ethylcarbodiimide hydrochloride (EDC) and 0.06 M N-hydroxysuccinimide (NHS) for 4 hours, washed with deionized water 3 times, and dried at room temperature for later use.

(12) About 450 μL of nucleic acid-ACP nanoparticle mineralizing solution was dropwise added into an EP tube cap to form a uniform spherical shape.

(13) A front surface of the nickel/gold net carrying collagen fibers was in contact with the mineralizing solution for mineralization for 5 days.

In an optimal solution, the selected matrix to be mineralized may be a solution of rat tail tendon type I collagen/acetic acid, a self-assembled rat tail tendon, a self-assembled 3D collagen scaffold, a collagen film, a demineralized bone tissue, a demineralized dentin slice, etc.

Example 2

Differences between this example and Example 1 are:
(1) Total DNA of cells is extracted using a kit by a Trizol™ method, and the initial concentration of the obtained DNA was determined by using the ELISA reader, which may be greater than 700 ng/μL.
(2) 150 μL of DNA was uniformly mixed with 425 μL of solutions of calcium chloride dihydrate in high and low concentrations respectively, 425 μL of solutions of dipotassium hydrogen phosphate in high and low concentrations were respectively slowly dropwise added into the mixed solutions of DNA-calcium chloride dihydrate. Two groups of stable and clear DNA-ACP nanoparticle mineralizing solutions in high and low concentrations were respectively synthesized, which were applied to later mineralization.

According to Examples 1 and 2, the biomimetic mineralization of collagen fibers induced by the nucleic acid-ACP nanoparticles constructed in the present disclosure has the following characteristics.

Figure 1:
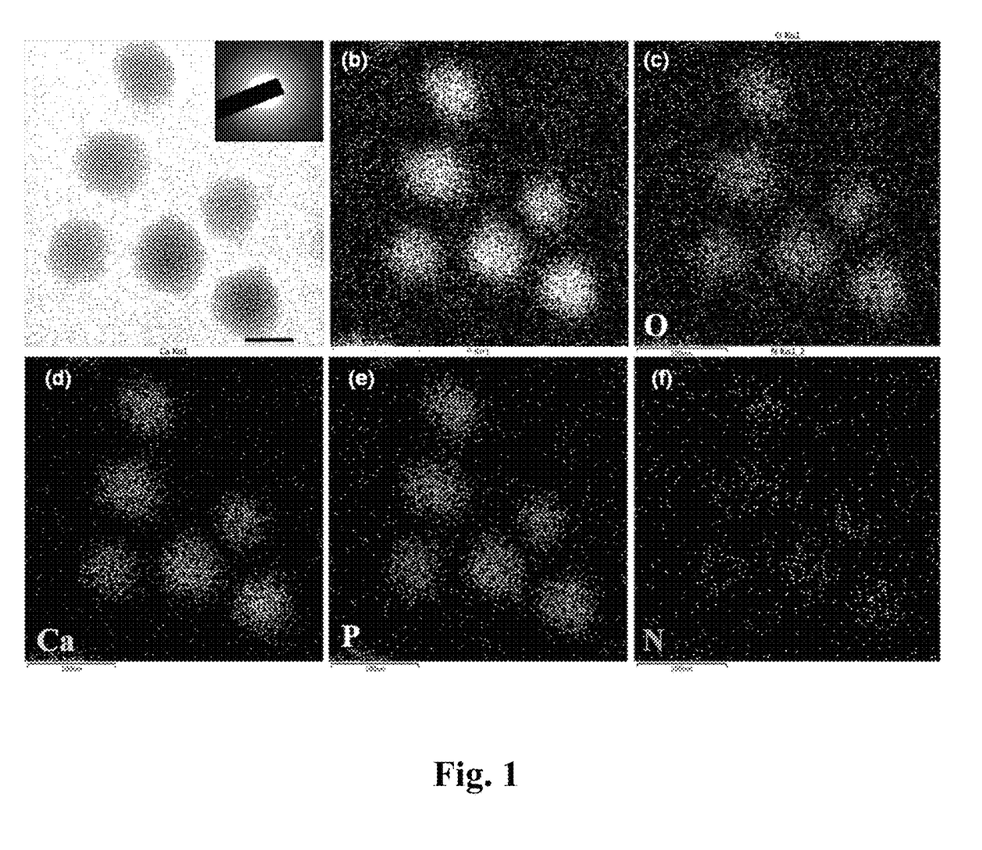
FIG. 1 is a transmission electron microscopy image of RNA-ACP nanoparticles in low concentration, wherein the upper right corner of (a) is a selected area electron diffraction image of the RNA-ACP nanoparticles; (c) to (f) are images of distribution of elements of oxygen, calcium, phosphorus, and nitrogen, respectively; and (b) is a composite image of distribution of the above four elements.

As shown in FIG. 1, a result of transmission electron microscopy shows that particles of the calcium phosphate complex constructed in Example 1 are spherical and have a relatively uniform size of about 50 nm (FIG. 1, a). A result of selected area electron diffraction shows that calcium phosphate is non-crystalline and amorphous (FIG. 1, the upper right corner of a). Results of energy-dispersive spectroscopy of elements show that main components of the electron-dense particles are oxygen, calcium, phosphorus, and nitrogen (FIG. 1, c to f). A composite image of elements (FIG. 1, b) shows that the distribution of nitrogen is consistent with those of other elements. Because nitrogen only exists in organic nucleic acids, this indicates that under this method, RNA can participate in stabilizing calcium and phosphorus particles, and finally form RNA-ACP nanoparticles having a relatively uniform particle size.

Figure 2A:
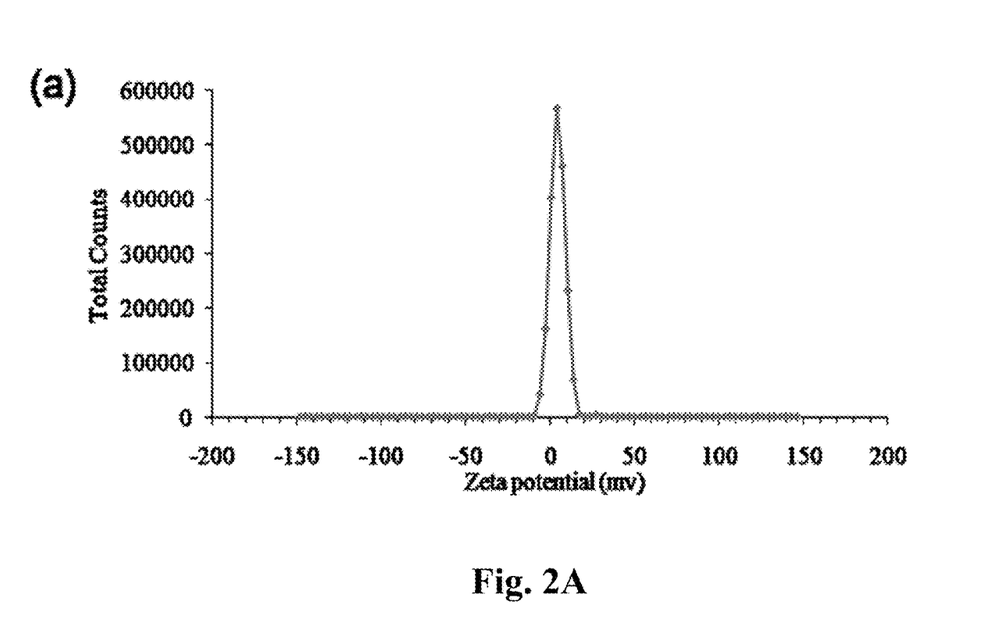
FIG. 2 is a diagram of potential and particle size distribution of calcium phosphate in low concentration, wherein (a) and (b) show potential and particle size distribution of a pure mixed solution of calcium and phosphate without stabilizers; (c) and (d) show potential and particle size distribution of an RNA-ACP mineralizing solution; and (e) and (f) show potential and particle size distribution of a DNA-ACP mineralizing solution.
Figure 2B:
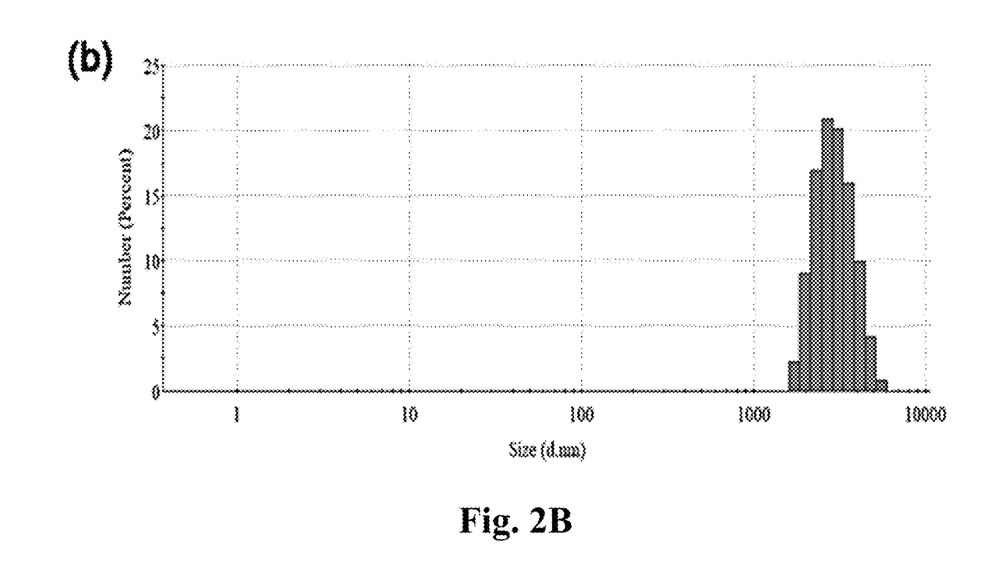
Figure 2C:
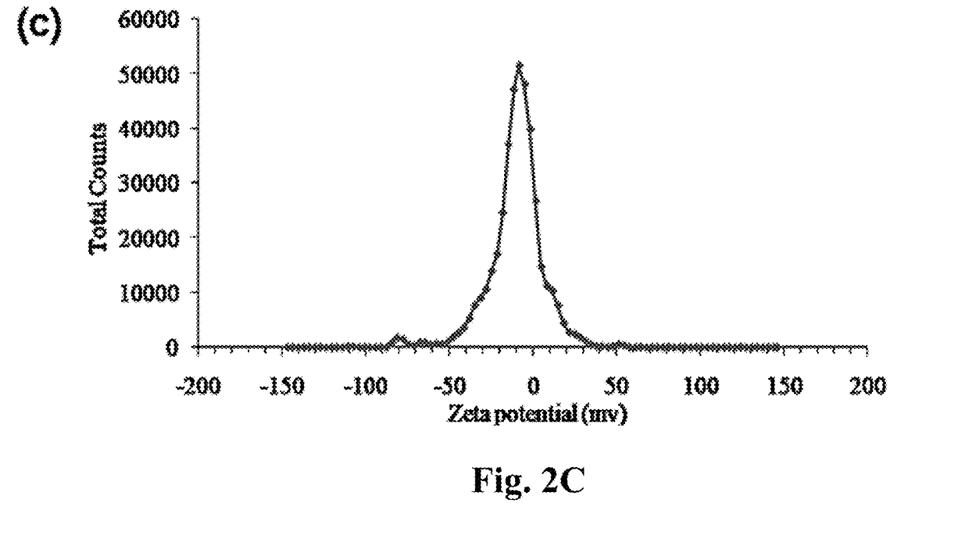
Figure 2D:
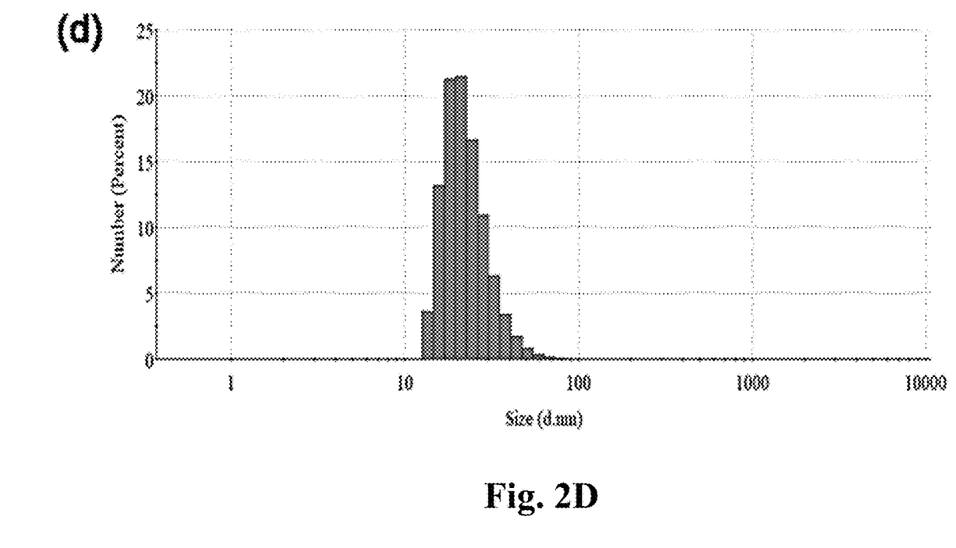
Figure 2E:
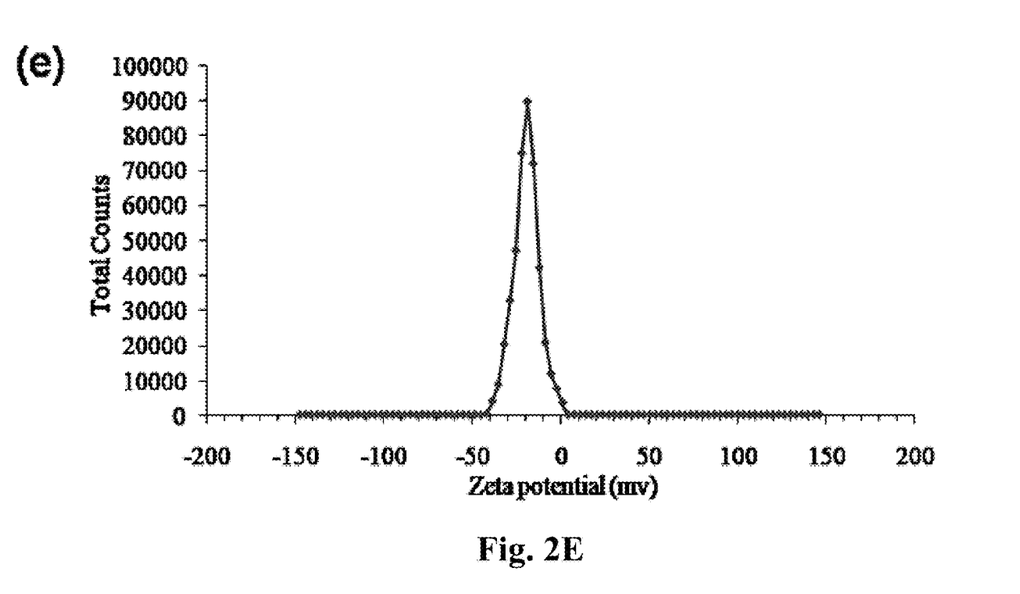
Figure 2F:
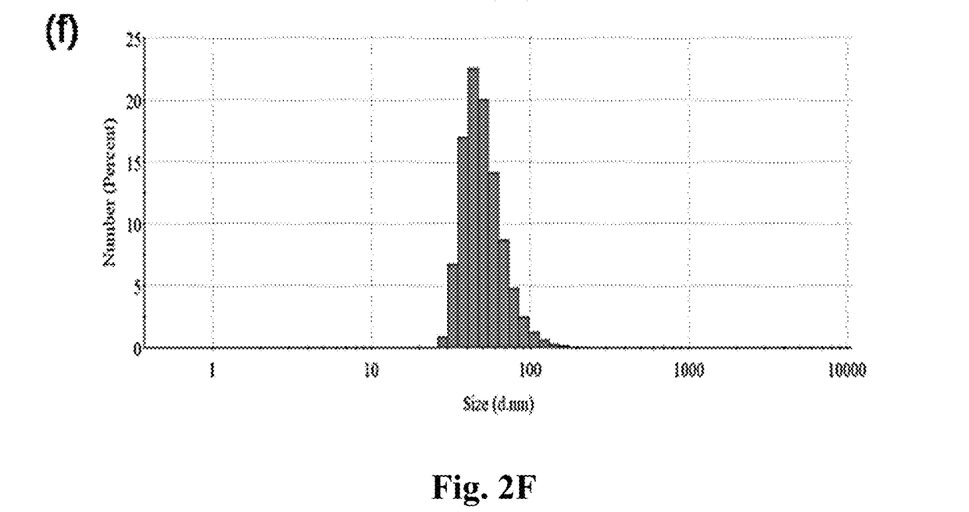

As shown in FIGS. 2A-2F, results of Zeta potential show that in a pure solution of calcium and phosphorus without any stabilizer (FIG. 2A, a), the potential is basically 0; in a solution of calcium and phosphate added with RNA (150 to 250 μg/mL) as a stabilizer (FIG. 2C, c), the potential is negative and about-10 mV; and in a solution of calcium and phosphorus added with DNA (150 g/mL) as a stabilizer (FIG. 2E, e), the potential is about-20 m V. This indicates that, because nucleic acids are negatively charged, the ACP nanoparticle complexes under the stabilization of nucleic acids are also negatively charged. Results of particle sizes show that in the pure solution of calcium and phosphorus without any stabilizer (FIG. 2B, b), the calcium and phosphorus particles have a particle size of greater than 1 μm, which indicates that the calcium and phosphorus particles are directly separated from the solution in the form of precipitates. While the DNA-ACP nanoparticles have a particle size of about 60 to 100 nm (FIG. 2F, f), and the RNA-ACP nanoparticles have a smaller and more uniform particle size, which is about 40 to 60 nm (FIG. 2D, d). This indicates that both RNA and DNA can participate in stabilizing calcium phosphate, and meanwhile, because DNA is of a double-stranded structure and has a larger molecular weight, the diameter of the DNA-ACP nanoparticles presented in space is slightly larger than that of the RNA-ACP nanoparticles.

Figure 3:
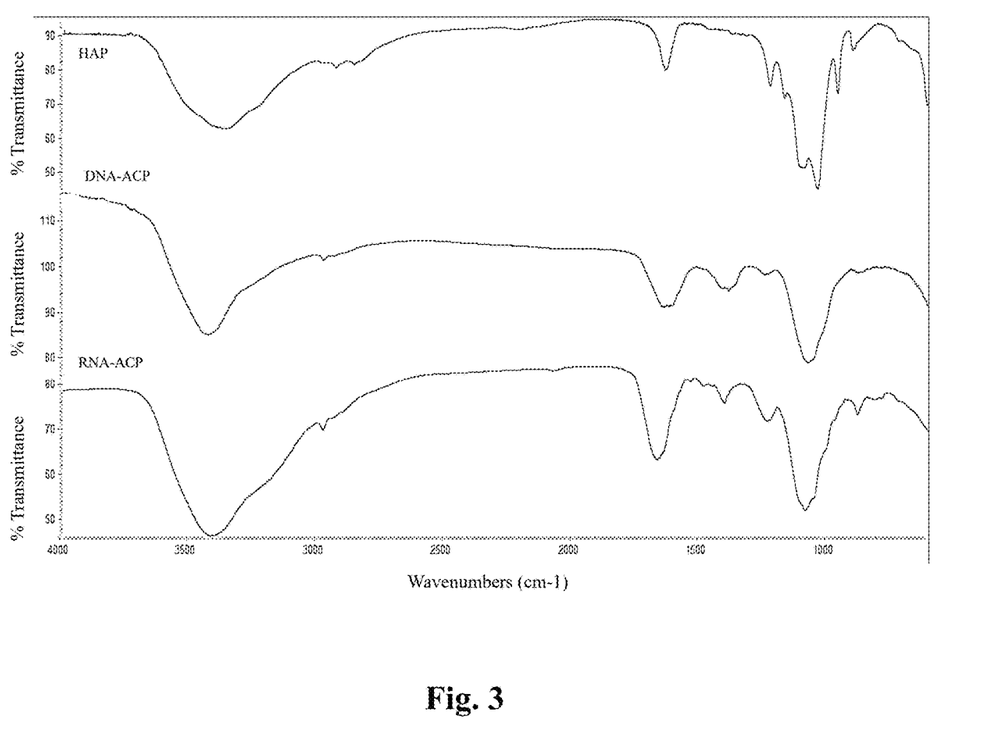
FIG. 3 is a Fourier infrared spectrogram, wherein from top to bottom, infrared spectrograms of hydroxyapatite lyophilized powder in low concentration, DNA-ACP lyophilized powder in low concentration, and RNA-ACP lyophilized powder in low concentration are shown in sequence.

As shown in FIG. 3, results of Fourier infrared spectroscopy show that RNA-ACP and DNA-ACP have vibration peaks of O—P—O bonds and phosphate groups at 500 cm−1, 600 cm−1, and 1,000 cm−1. This indicates that the RNA-ACP and DNA-ACP complexes contain calcium phosphate. Meanwhile, vibration peaks of characteristic bases of RNA and DNA, such as guanine, adenine, and cytosine, do not change. Therefore, it indicates that structures of RNA and DNA in the two types of complexes have not been damaged and still remain stability.

Figure 4:
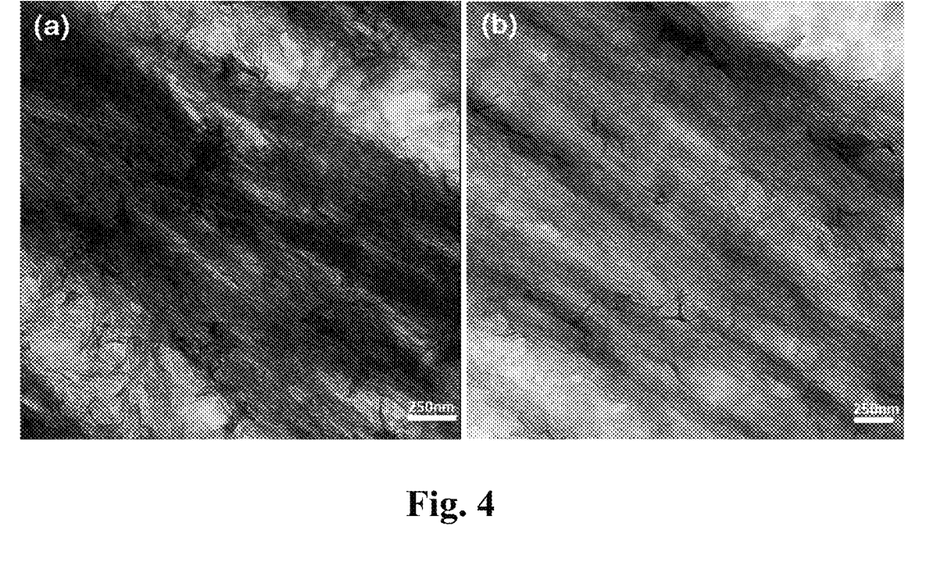
FIG. 4 is a transmission electron microscopy image of collagen fibers, wherein (a) shows that after the collagen fibers are mineralized with an RNA-ACP mineralizing solution in low concentration for 5 days, intra- and extrafibrillar mineralization of collagen can be observed; (b) shows that after the collagen fibers are mineralized with a DNA-ACP mineralizing solution in low concentration for 5 days, intra- and extrafibrillar mineralization of collagen is completed.

As shown in FIG. 4, results of transmission electron microscopy (FIG. 4, a to b) show that when nucleic acid-ACP is used as a mineralizing solution, ACP nanoparticles can enter collagen fibers, further grow in order along a C axis of the collagen fibers, and finally are transformed into thermodynamically stable hydroxyapatite to complete intrafibrillar mineralization of collagen fibers. At the same time, calcium and phosphorus can also be deposited between or on surfaces of the collagen fibers, and grow disorderly along various directions to finally complete extrafibrillar mineralization of collagen fibers. This indicates that the nucleic acid-ACP has the effect of inducing intra- and extrafibrillar mineralization of collagen fibers, and can simulate the fine characteristics of microstructures of mineralized collagen of natural bone tissues, which lays a firm foundation for the preparation of biomimetic bone repair materials.

Figure 5:
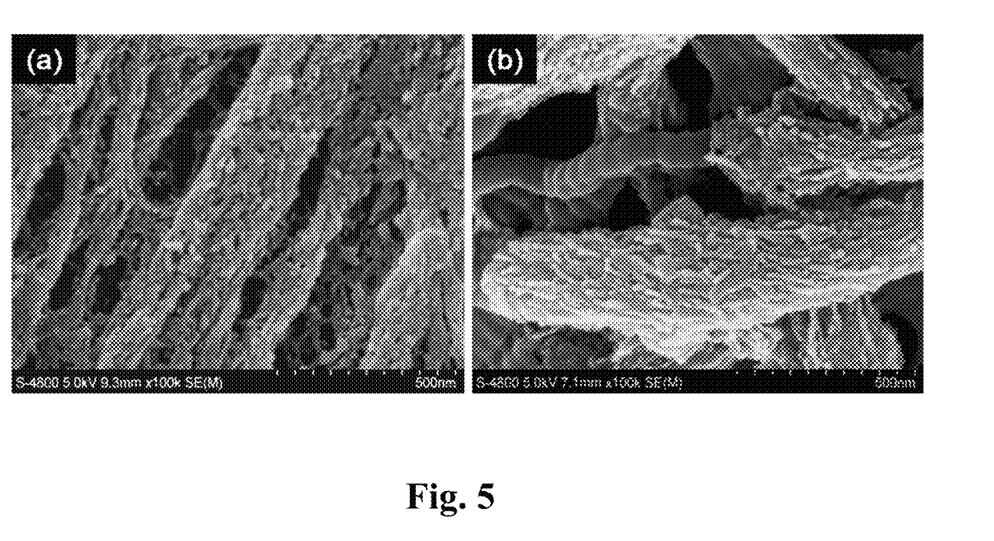
FIG. 5 is a scanning electron microscopy image of a collagen fiber scaffold, wherein (a) shows surface topography of mineralized collagen fibers of a femur of a 4-month-old mouse; and (b) shows surface topography of a pure collagen fiber scaffold mineralized with an RNA-ACP mineralizing solution in low concentration for 5 days, and intra- and extrafibrillar mineralization of collagen can be observed.

As shown in FIG. 5, a result of scanning electron microscopy shows that after a pure collagen fiber scaffold is mineralized with RNA-ACP for 5 days (FIG. 5, b), the collagen fiber scaffold has expanded in volume in many places, and meanwhile, surfaces of the expanded places are not smooth, and an original characteristic transverse striation structure is covered. It indicates that the space inside and outside the fibers is occupied by inorganic minerals, and intra- and extrafibrillar mineralization of collagen occurs. It is worthwhile to note that a result of scanning electron microscopy (FIG. 5, a) shows that the surface morphology of mineralized collagen of a femur of a natural mouse is also very rough, and the surface is covered with hydroxyapatite, which is extremely consistent with the morphology of the mineralized collagen fibers induced by the RNA-ACP mineralizing solution. This indicates that the stabilizers, the preparation methods, and the mineralization processes used in Examples 1 and 2 are similar to the real in vivo mineralization of collagen fibers. Therefore, the preparation of the material is relatively bionic in terms of mineralization mode.

Figure 6:
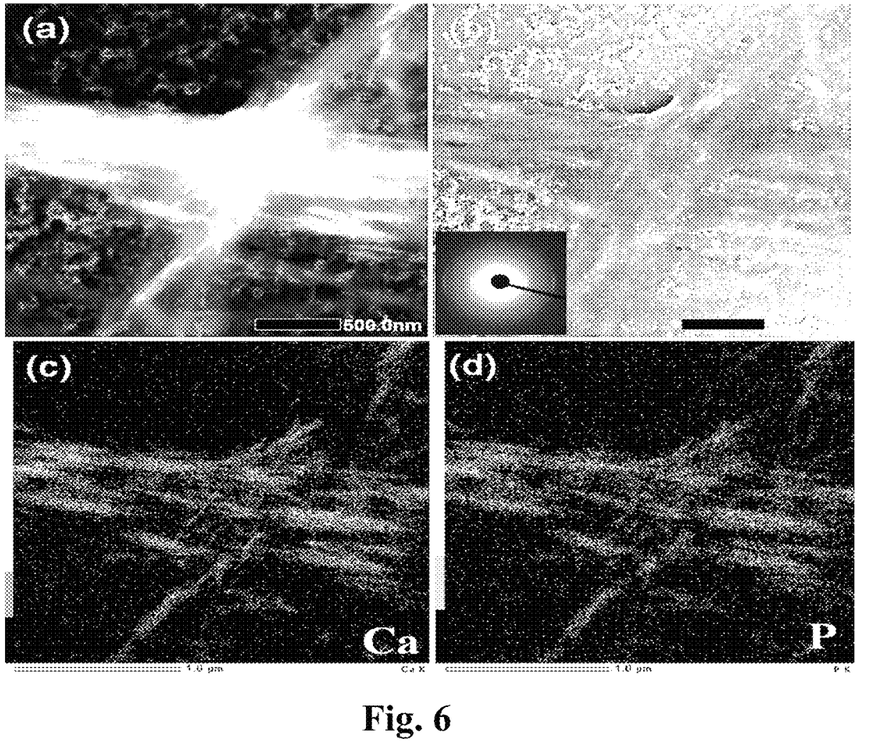
FIG. 6 is a scanning electron microscopy image of collagen fibers mineralized with an RNA-ACP mineralizing solution in low concentration for 5 hours, wherein (a) shows that calcium phosphate is deposited in order in the collagen fibers to complete intrafibrillar mineralization of collagen, which is observed by using a dark-field microscope; the lower left corner of (b) is a selected area electron diffraction image showing that calcium phosphate has been transformed into hydroxyapatite crystals arranged along a C axis of collagen; and (c) and (d) are images of distribution of elements of calcium and phosphorus, respectively.

As shown in FIG. 6, a result of scanning transmission electron microscopy shows that a large area of collagen can be intrafibrillarly mineralized within only 5 hours of contact with an RNA-ACP mineralizing solution (FIG. 6, a). A result of distribution of elements shows that calcium and phosphorus are deposited in order in the collagen fibers, and meanwhile, a result of selected area electron diffraction also shows that the minerals deposited in the collagen fibers are ordered hydroxyapatite crystals. This indicates that RNA, as an agent for stabilizing calcium and phosphorus and inducing collagen fibers, can rapidly induce intrafibrillar mineralization of a large area of collagen, with extremely short mineralization time and extremely high efficiency. This provides strong support for the efficient preparation and clinical transformation of bone repair materials.

Figure 7:
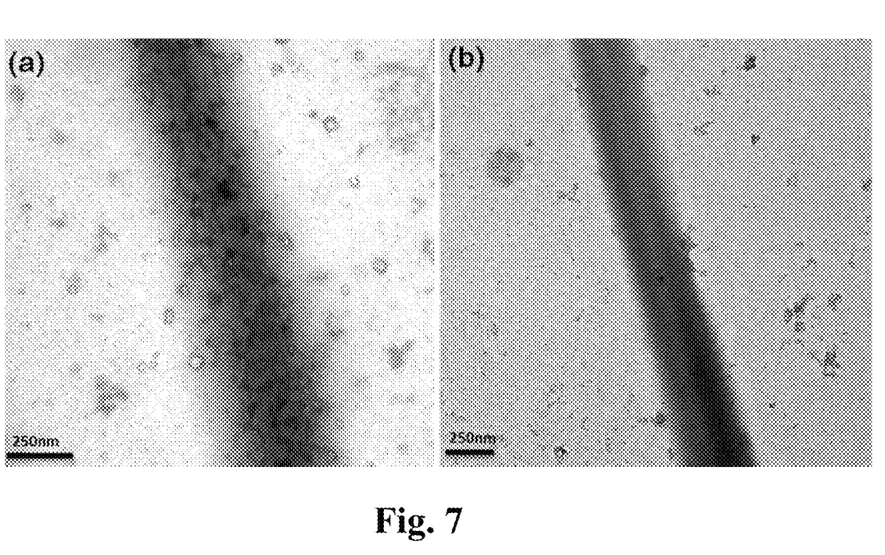
FIG. 7 is a transmission electron microscopy image of collagen fibers stained with ruthenium red, wherein (a) shows pure collagen fibers that are co-incubated with pure RNA (200 µg/mL) for 48 hours, washed, and stained with ruthenium red; and (b) shows pure collagen fibers that are co-incubated with nuclease-free water for 48 hours, washed, and stained with ruthenium red.

As shown in FIG. 7, after being co-incubated with pure RNA for 48 hours, pure collagen fibers are washed and stained with ruthenium red. Results of transmission electron microscopy show that the electron-dense RNA-ruthenium red stain solution is uniformly adsorbed onto a larger area of collagen fibers (FIG. 7, a), and the collagen fibers that are not co-incubated with RNA have no electron-dense particles (FIG. 7, b). This indicates that there is an adsorption force between RNA and collagen, which further verifies the bionics of the experimental model involved in the present patent, and provides an important idea for verifying the real mechanism of in vivo intrafibrillar mineralization of collagen.

The present disclosure has been further described above in detail with reference to specific preferred embodiments, but the specific embodiments of the present disclosure are not limited thereto. For those of ordinary skill in the art to which the present disclosure belongs, several simple deductions or substitutions can be made without departing from the concept of the present disclosure, and all of these deductions or substitutions shall be regarded as belonging to the present disclosure, and fall within the scope of patent protection determined by the submitted claims.

The invention claimed is:

1. A method producing a biological mineralizer for the mineralization of collagen fiber products and for preparing hydroxyapatite-collagen organic-inorganic composite materials,
    the method comprising the forming of a complex by the electrostatic adsorption of nucleic acid and amorphous calcium phosphate nanoparticles in solution comprising the steps in the following sequential order of:
        1) mixing a solution containing nucleic acids with a solution of calcium ions so that there is electrostatic adsorption between the phosphate groups of the nucleic acid and the calcium ions and
        2) adding to the solution formed in step 1) a solution of potassium ions so that there is electrostatic adsorption of the free phosphate ions with the calcium ions adsorbed on the nucleic acid, thereby forming the complex of nucleic acid and amorphous calcium phosphate nanoparticles in solution,
    wherein the concentration of calcium ions in the biological mineralizer is 2-5 mM, and the concentration of phosphate ions in the biological mineralizer is 1-5 mM,
    wherein the ratio of the calcium ions to the phosphate ions in the biological mineralizer is from 2:1 to 1:1,
    wherein the nucleic acid is total DNA or total RNA isolated from mammalian cells,
    wherein the final working concentration of DNA is 70-250 µg/ml, or the final working concentration of RNA is 150-250 µg/ml, and
    wherein the particle size of the biological mineralizer complex is 40-100 nm.

2. The method of claim 1, wherein the biological mineralizer complex is formed by mixing a solution of nucleic acid with a solution of calcium chloride and a solution of dipotassium hydrogen phosphate.

3. The method of claim 1, wherein the calcium ion concentration in the biological mineralizer is 1.67 to 3.5 mM; and the phosphate ion concentration in the biological mineralizer is 1.0 to 2.1 mM.

4. The method of claim 1, wherein the ratio of the calcium ions to the phosphate ions in the biological mineralizer is 1.67:1.

5. The method of claim 1, wherein the biological mineralizer complex has a particle size of 40 to 60 nm or 60 to 100 nm.

6. The method of claim 1, wherein the mammalian cells are osteoprogenitor cells, pre-osteoblasts, osteocytes, osteogenitor cells, osteoclasts, or bone marrow stromal cells.

7. The method of claim 1, wherein the mammalian cells are osteoclasts.

8. The method of claim 1, wherein the mammalian cells are osteocytes.

9. The method of claim 1, wherein the pH value of the biological mineralizer is 5.5-6.9.

10. The method of claim 9, wherein the pH value of the biological mineralizer is 6.0-6.5.

11. The method of claim 1, wherein the biological mineralizer complex is formulated in a liquid, a semisolid, or in a solid.

12. The method of claim 1, wherein the biological mineralizer complex is formulated in a solution, colloidal solution, gel or powder.

13. The method of claim 1, wherein the biological mineralizer complex is formulated as a lyophilized powder.

14. The method of claim 1, wherein the collagen fiber product is a bone repair material.

15. The method of claim 1, wherein the collagen fiber product is a collagen scaffold.

16. The method of claim 1, wherein the collagen fiber product is selected from collagen films and collagen fiber sheets.

17. The method of claim 1, wherein the hydroxyapatite-collagen organic-inorganic composite materials is used in preparation of drugs or medical devices for treating bone-associated diseases or disorders or improving bone conditions in patients.

18. The method of claim 1, further comprising:
prior to step 1), obtaining nucleic acid by extracting total DNA or total RNA from mammalian cells,
wherein step 1) further comprises mixing the nucleic acid obtained with a solution of calcium chloride, and
wherein step 2) further comprises adding a solution of dipotassium hydrogen phosphate into the mixture obtained at step 1).

19. The method of claim 18, wherein the initial concentration of the nucleic acid obtained is 1,500 to 2,500 ng/μL; and the nucleic acid has a molecular weight of greater than 40 kDa.

* * * * *